Figure 1:
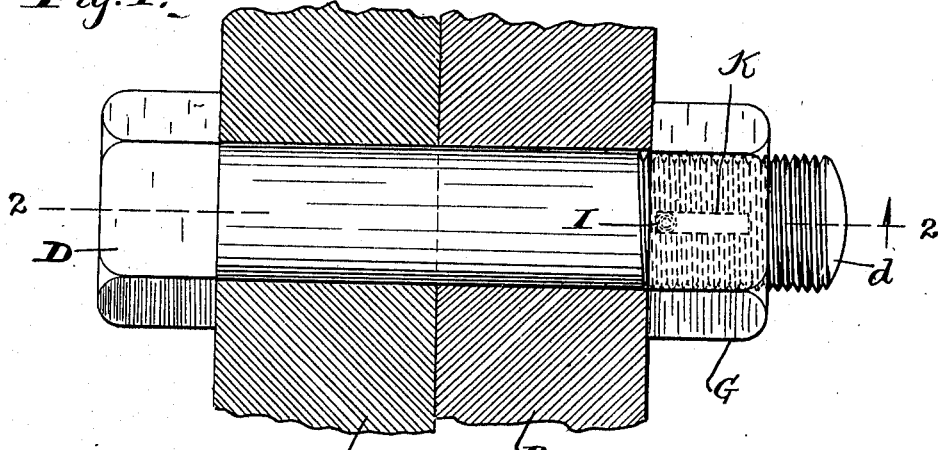

J. BURGERT & R. FRANKE.
NUT LOCK.
APPLICATION FILED AUG. 20, 1910.

974,468.

Patented Nov. 1, 1910.

Witnesses:
H. J. Gittins.
B. C. Brown.

Inventors
Joseph Burgert
and
Rudolph Franke
By
their Attorneys.

THE NORRIS PETERS CO., WASHINGTON, D. C.

UNITED STATES PATENT OFFICE.

JOSEPH BURGERT AND RUDOLPH FRANKE, OF CLEVELAND, OHIO.

NUT-LOCK.

974,468.  Specification of Letters Patent.  Patented Nov. 1, 1910.

Application filed August 20, 1910. Serial No. 578,157.

*To all whom it may concern:*

Be it known that we, JOSEPH BURGERT and RUDOLPH FRANKE, both citizens of the United States of America, both residents of Cleveland, in the county of Cuyahoga, State of Ohio, have invented certain new and useful Improvements in Nut-Locks; and we do hereby declare the following to be a full, clear, and exact description of the invention, such as will enable others skilled in the art to which it pertains to make and use the same.

This invention relates to improvements in nut-locks, and more especially to a nut-lock in which the bolt has the screw-threaded portion of its shank provided with a recess which is spaced from the free extremity and arranged longitudinally of the shank and enlarged at its inner end toward the center of the said shank, which recess is covered by the nut screwed onto the bolt, which nut is provided internally with a recess extending endwise of the nut and arranged to be brought into registry with the aforesaid recess in the bolt during the screwing of the nut onto the bolt and increasing in depth circumferentially of the bolt and in the direction in which the nut is turned in screwing the nut onto the bolt so as to form a side wall which faces in the opposite direction and is arranged to be overlapped by a key which is arranged loose within and longitudinally of the recess in the bolt and overlaps the outer end of a spiral spring confined between the said key and the bottom of the aforesaid enlargement of the last-mentioned recess, said key being held by the said spring in contact with the nut so that when the recess in the nut is brought into registry with the recess in the bolt in screwing the nut into place onto the bolt the key is actuated by the spring into the recess in the nut and overlaps the aforesaid wall so that unscrewing or withdrawing of the nut from the bolt is prevented without interfering with the screwing of the nut farther if not already screwed far enough onto the bolt.

One object of this invention is to provide a nut-lock of the character indicated which is exceedingly simple in construction and reliable in its operation.

Another object is to provide a construction in which the aforesaid key, recesses and spring are invisible from the outer end and sides of the nut and from the free extremity of the shank of the bolt.

With these objects in view, and to attain any other advantage hereinafter appearing, this invention consists in certain features of construction, and combinations and arrangement of parts, hereinafter described, pointed out in the claims, and illustrated in the accompanying drawings.

Figure 2:
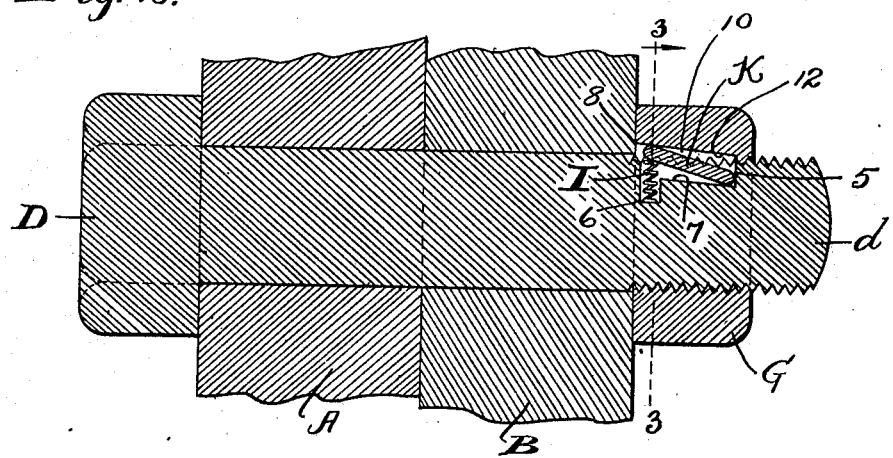
Figure 3:
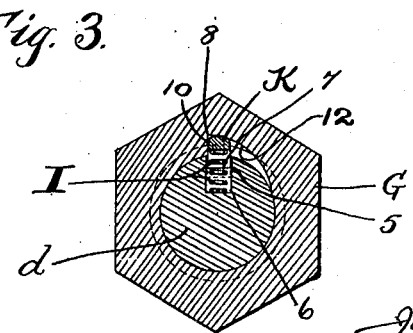

In the said drawings, Figure 1 is a side view of a bolt and a nut locked on the bolt by a nut-lock embodying our invention, and this figure shows, in section, two parts or members clamped by and between the nut and the head of the bolt. Fig. 2 is a vertical section on line 2—2, Fig. 1, looking in the direction indicated by the arrow. Fig. 3 is a transverse vertical section on line 3—3, Fig. 2, looking in the direction indicated by the arrow.

Referring to the said drawings, A and B indicate two parts or members to be clamped together by a bolt D and a nut G. The bolt has its head abutting against the outer side of the member A, and the shank of the bolt extends through the said members A and B and has its screw-threaded portion *d* extending beyond the outer side of the member B. The nut G is screwed onto the said shank and shown tightened against the outer side of the member B.

The screw-threaded portion *d* of the shank of the bolt is provided with a recess 5 which is arranged longitudinally of the said shank and spaced a suitable distance from the free extremity of the shank. The recess 5 is enlarged at its inner end, as at 6, toward the center and substantially radially of the shank of the bolt and has its bottom 7 slanting from the open end of the said enlargement of the said recess toward the center of the said shank and toward the outer end of the recess.

The nut G is screwed onto and covers the recessed portion of the shank of the bolt and is provided internally with a recess 8 which extends endwise of the nut. Preferably the recess 8 extends from the inner end face of the nut a suitable distance toward the outer end of the nut and is spaced from the outer end face of the nut. The recess 8 is deepest at the inner end face of the nut and gradually reduced in depth toward the outer end of the nut as shown in Fig. 2. The recess 8, as shown in Fig. 3, has its depth gradually increasing circumferentially of the bolt and in the direction in which the nut is turned in screwing the nut onto the bolt so as to form a side wall 10 which faces in the opposite direction and is arranged approximately radially of the nut. It will be observed that the recess 8, having the dimensions and shape hereinbefore indicated, not only has the side wall 10 but another wall 12 which extends circumferentially of the bolt and not only slopes, as shown in Fig. 3, away from the bolt in the direction in which the nut is turned in screwing the nut onto the bolt, but also slopes, as shown in Fig. 2, from the inner face of the nut toward the bolt in the direction of the outer end of the nut, so that the strength of the nut is affected as little as possible by the said recess.

A spiral spring I is arranged within the enlargement 6 of the recess 5 in the bolt and consequently radially of the bolt. The spring I abuts at its inner end against the bottom of the said enlargement and is confined between the said bottom and a key K which is arranged loose within and extends longitudinally of the recess 5 in the bolt. Preferably the key K has its ends rounded, as shown in Fig. 2. The said key at its inner end overlaps the outer end of the spring I which acts to retain the key at the said end in contact with the nut, and obviously the key is held at its inner end by the spring in contact with the sloping wall 12 of the recess 8 in the nut when the said recess during the screwing of the nut into place on the bolt is brought into registry with the recess 5 in the bolt, as shown in Fig. 2. Preferably the key K is uniform in dimensions from end to end of the key. Preferably the recess 5 in the bolt is not only deeper from end to end of the recess than the thread of the shank of the bolt, but has enough greater depth than the said thread to render the recess capable of wholly receiving the key between the said thread and the center of the shank of the bolt in the absence of the spring. In any case we prefer to have the recess in the bolt enough deeper at its outer end than the thread of the bolt to wholly receive the rounded outer end of the key below the said thread so that the said end of the key is out of the way of the nut in screwing the nut onto the bolt. The key is rounded at its outer end to positively insure avoiding any obstruction by the key to the nut during the screwing of the nut onto the bolt. The rounding of the key at its inner end avoids cutting or mutilation of the nut by the key.

Not unimportant is the construction hereinbefore described in that the key, the recesses in the bolt and nut, and the spring are wholly invisible from the sides and outer end of the nut, and from the free extremity of the shank of the bolt, when the nut is screwed into place on the bolt, so that the presence of a nut-lock is concealed and tampering with the nut-lock is not only prevented but not invited or suggested.

It is obvious of course that the overlapping of the wall 10 of the recess in the nut by the key K positively prevents unscrewing or withdrawal of the nut from the bolt, and it is also evident that the nut, instead of having only one recess, as shown, may be provided with a plurality of such recesses spaced circumferentially of the bolt, but the provision of a nut with a plurality of recesses for successively receiving a key on the bolt during the screwing of the nut into place on the bolt is too well known in the art to require description and illustration in this specification.

What we claim is:—

1. In a nut-lock, in combination, a bolt having the screw-threaded portion of its shank provided with a recess which is arranged longitudinally of the shank, which recess is enlarged at its inner end toward and substantially radially of the shank; a nut screwed onto the recessed portion of the said shank and provided internally with a recess extending endwise of the nut, which recess has a depth increasing in the direction in which the nut is turned in screwing the nut onto the bolt so as to form a side wall which faces in the opposite direction; a spiral spring arranged within the aforesaid enlargement of the recess in the bolt and substantially radially of the bolt, and a key arranged loose within and longitudinally of the recess in the bolt, which key overlaps the outer end of the spring and is held by the spring in contact with the nut.

2. In a nut-lock, in combination, a bolt having the screw-threaded portion of its shank provided with a recess which is arranged longitudinally of the shank, which recess is enlarged at its inner end toward the center and substantially radially of the shank; a nut screwed onto the recessed portion of the said shank and provided internally with a recess extending endwise of the nut, which recess has a depth increasing in the direction in which the nut is turned in screwing the nut onto the bolt and has a side wall which faces in the opposite direction; a spiral spring arranged within the aforesaid enlargement of the recess in the bolt and substantially radially of the bolt, and a key arranged loose within and longitudinally of the recess in the bolt, which key overlaps the outer end of the spring and is held by the spring in contact with the nut, said key having its outer end rounded and also having bearing at the said end on the bottom of the recess in the bolt.

3. In a nut-lock, in combination, a bolt having the screw-threaded portion of its shank provided with a recess which is spaced from the free extremity and arranged longitudinally of the shank, which recess is enlarged at its inner end toward the center and substantially radially of the shank; a nut screwed onto the recessed portion of the shank and provided internally with a recess extending from the inner end face of the nut toward the outer end of the nut but spaced from the outer end face of the nut, which recess has a depth gradually increasing in the direction in which the nut is turned in screwing the nut onto the bolt so as to form a side wall which faces in the opposite direction; a spiral spring arranged within the aforesaid enlargement of the recess in the bolt and substantially radially of the bolt, and a key arranged loose within and longitudinally of the recess in the bolt, which key overlaps the outer end of the spring and is held by the spring in contact with the nut.

4. In a nut-lock, in combination, a bolt having the screw-threaded portion of its shank provided with a recess which is spaced from the free extremity and arranged longitudinally of the shank, which recess is enlarged at its inner end toward the center and substantially radially of the shank and has its bottom slanting from the open end of the said enlargement of the recess both toward the center and toward the free extremity of the shank; a nut screwed onto the recessed portion of the said shank and provided internally with a recess extending from the inner end face of the nut toward the outer end of the nut but spaced from the outer end face of the nut, which recess has a depth increasing in the direction in which the nut is turned in screwing the nut on the bolt, and has a side wall which faces in the opposite direction; a spiral spring arranged within the aforesaid enlargement of the recess in the bolt and substantially radially of the bolt, and a key arranged loose within and longitudinally of the recess in the bolt, which key overlaps the outer end of the spring and is held by the spring in contact with the nut, said key having bearing at its outer end on the bottom of the recess in the bolt.

5. In a nut-lock, in combination, a bolt having the screw-threaded portion of its shank provided with a recess which is spaced from the free extremity and arranged longitudinally of the shank; a nut screwed onto the recessed portion of the said shank and provided internally with a recess extending endwise of the nut and having a depth increasing in the direction in which the nut is turned in screwing the nut onto the bolt, and a key arranged loose within and longitudinally of the recess in the bolt, which key is substantially uniform in dimensions from end to end and has rounded ends, and a spiral spring acting to retain the key in contact with the nut, the recess in the bolt being enough deeper than the thread of the bolt to wholly receive the key at its outer end below the thread.

6. In a nut-lock, in combination, a bolt having the screw-threaded portion of its shank provided with a recess which is spaced from the free extremity and arranged longitudinally of the shank; a nut screwed onto the recessed portion of the said shank and provided internally with a recess extending from the inner end face of the nut toward the outer end of the nut but spaced from the outer end face of the nut, which recess has a wall extending circumferentially of the bolt and sloping toward the bolt in the direction of the outer end of the nut, said wall also sloping away from the bolt in the direction in which the nut is turned in screwing the nut onto the bolt; a key arranged loose within and longitudinally of the recess in the bolt, which key is rounded at its outer end and has bearing at the said end on the bottom of the recess in the bolt, and a spring acting to retain the key in contact with the nut.

7. In a nut-lock, in combination, a bolt having the screw-threaded portion of its shank provided with a recess which is spaced from the free extremity and arranged longitudinally of the shank; a nut screwed onto the recessed portion of the said shank and provided internally with a recess extending from the inner end face of the nut toward and spaced from the outer end face of the nut, which recess is deepest at the inner end of the nut and reduced in depth toward the outer end of the nut, said recess increasing in depth circumferentially of the bolt and in the direction in which the nut is turned in screwing the nut onto the bolt so as to form a side wall which faces in the opposite direction; a key arranged loose within and longitudinally of the recess in the bolt, and a spring for holding the key at the outer end of the key in contact with the nut.

Signed by us at Cleveland, Ohio this 13th day of August, 1910.

JOSEPH BURGERT.
RUDOLPH FRANKE.

Witnesses:
C. H. DORER,
B. C. BROWN.